(12) United States Patent
Davis, II et al.

(10) Patent No.: US 6,550,361 B1
(45) Date of Patent: Apr. 22, 2003

(54) PLATEN DIE CUTTING MONITORING SYSTEM

(75) Inventors: Denny Earl Davis, II, Covington, VA (US); Edward Allan Weller, Staunton, VA (US)

(73) Assignee: Mead Westvaco Corporation, Stamford, CT (US)

( * ) Notice: Subject to any disclaimer, the term of this patent is extended or adjusted under 35 U.S.C. 154(b) by 0 days.

(21) Appl. No.: 09/593,538

(22) Filed: Jun. 14, 2000

(51) Int. Cl.[7] .................................................. B26D 1/00
(52) U.S. Cl. .................................... 83/13; 83/72; 83/74
(58) Field of Search ................................ 83/74, 76.6, 72, 83/527, 62, 62.1, 13; 700/175, 99; 100/99

(56) References Cited

U.S. PATENT DOCUMENTS

| | | | |
|---|---|---|---|
| 2,181,639 A | | 11/1939 | Curtis, Jr. |
| 2,220,056 A | | 10/1940 | Donnerberg et al. |
| 3,319,053 A | | 5/1967 | Roberts |
| 3,411,345 A | | 11/1968 | Wintriss |
| 3,742,795 A | | 7/1973 | Lipcon et al. |
| 4,442,493 A | * | 4/1984 | Wakai et al. .................. 83/62 |
| 4,461,182 A | * | 7/1984 | Jones, Jr. et al. ........ 73/862.53 |
| 4,466,318 A | | 8/1984 | Schoch |
| 4,484,285 A | | 11/1984 | deVersterre et al. |
| 4,552,048 A | * | 11/1985 | Wallance et al. ............... 83/62 |
| 4,658,921 A | | 4/1987 | Karpa |
| 4,812,984 A | | 3/1989 | Yerly et al. |
| 4,890,468 A | | 1/1990 | Frisch et al. |
| 4,942,795 A | | 7/1990 | Linke et al. |
| 5,027,631 A | | 7/1991 | Naito |
| 5,091,962 A | * | 2/1992 | Malloy et al. .................. 83/62 |
| 5,303,574 A | | 4/1994 | Matossian et al. |
| 5,407,265 A | * | 4/1995 | Hamidieh et al. .......... 340/680 |
| 5,433,649 A | * | 7/1995 | Nishida .......................... 83/62 |
| 5,599,142 A | | 2/1997 | Fujimoto et al. |
| 5,765,458 A | | 6/1998 | Nakagawa et al. |
| 5,862,728 A | | 1/1999 | Giamello |
| 5,953,972 A | | 9/1999 | Nakagawa |

* cited by examiner

Primary Examiner—Kenneth E. Peterson
Assistant Examiner—Omar Flores-Sánchez

(57) ABSTRACT

This invention relates to the monitoring of platen die cutting. Such structures of this type, generally, periodically examine the force profiles from a strain gage mounted near the platen die cutter mouth. This system measures not only the maximum forces developed, but also monitors other features of the loading curve, such as the paper-bursting point. Quality of cutting, as well as die wear, can be more readily assessed with this additional information and adjustments made to improve cutting results before the adverse effects show in visual inspections of the product.

5 Claims, 5 Drawing Sheets

PLATEN DIE CUTTING MONITORING SYSTEM

BACKGROUND OF THE INVENTION

1. Field of the Invention

This invention relates to the monitoring of platen die cutting. Such structures of this type, generally, periodically examine the force profiles from a strain gage mounted near the platen die cutter mouth. This system measures not only the maximum forces developed, but also monitors other features of the loading curve, such as the paper-bursting point. Quality of cutting, as well as die wear, can be more readily assessed with this additional information and adjustments made to improve cutting results before the adverse effects show in visual inspections of the product.

2. Description of the Related Art

In platen die cutting of paperboard, die wear and maladjustment show as incomplete or partial cuts in the final product. The usual method of determining the state of the die is to visually inspect samples of the cut paper. If partial cuts are observed, the platen die must be adjusted or replaced. A typical adjustment is to increase the pressure or tonnage on the die, and thus increase the cutting force.

It is known to examine the maximum cutting force or have as a goal to keep a constant force using some actuator. Exemplary of such prior art is U.S. Pat. No. 4,812,984 ('984) to M. Yerly et al., entitled "Method and Device for Measuring the Cutting Forces and Limiting Overloads of the Cutting Force in a Platen Press". While the '984 reference employs a device to measure the forces statically, the further advantageous system would be one which measured the forces dynamically.

It is also known to employ a device which determines tool wear or prevents overload of the machinery. Exemplary of such prior art is U.S. Pat. No. 5,599,142 ('142) to A. Fujimoto et al., entitled "Drilling Control Apparatus." While the '142 reference determines tool wear or prevents machinery overload, its emphasis is on the machine, rather than the product.

Finally, it is known to press manufacturers to include a tonnage gage in their presses to monitor the maximum cutting force. The manufacturers have used strain gages in various locations on the platen cutter to show the forces involved in cutting (see FIG. 1 which is a graphical illustration prepared by Bobst, Inc.) and includes a strain gage-based tonnage sensor on their latest platen die cutters. However, the shortcoming of this technique is that only the maximum forces are monitored and force values less than the maximum are ignored.

It is apparent from the above that there exists a need in the art for a system which monitors platen die cutting, and ensures a high quality of the end product, but which measures the forces dynamically. It is a purpose of this invention to fulfill this and other needs in the art in a manner more apparent to the skilled artisan once given the following disclosure.

SUMMARY OF THE INVENTION

Generally speaking, this invention fulfills these needs by providing a platen die cutting monitoring system, comprising a strain measurement means operatively connected to a platen die cutter, a signal conditioning means operatively connected to the strain measurement means, a waveform time averaging means operatively connected to the signal conditioning means, a waveform peak detection means operatively connected to the waveform time averaging means, and a peak comparison means operatively connected to the waveform peak detection means and the platen die cutter.

In certain preferred embodiments, the strain measurement means includes a strain gage. Also, the waveform peak detection means includes a digital filter. Finally, the peak comparison means includes a die cutter condition indication means.

In another further preferred embodiment, as the difference between the paper burst peak and the maximum force shrinks below a threshold limit, the platen begins to leave portions of the board uncut. If action to increase the difference in the peaks is taken before the difference falls below this threshold limit, then the paperboard is never left partially cut which ensures delivery of high-quality product from the platen cutter.

The preferred system, according to this invention, offers the following advantages: lightness in weight; good stability; good durability; excellent economy; excellent platen die cutter monitoring; and excellent cutting. In fact, in many of the preferred embodiments, these factors of economy, monitoring, and cutting are optimized to the extent that is considerably higher than heretofore achieved in prior, known systems.

The above and other features of the present invention, which will become more apparent as the description proceeds, are best understood by considering the following detailed description in conjunction with the accompanying drawings, wherein like characters represent like parts throughout the several views and in which:

A BRIEF DESCRIPTION OF THE DRAWINGS

DETAILED DESCRIPTION OF THE INVENTION

Figure 1:
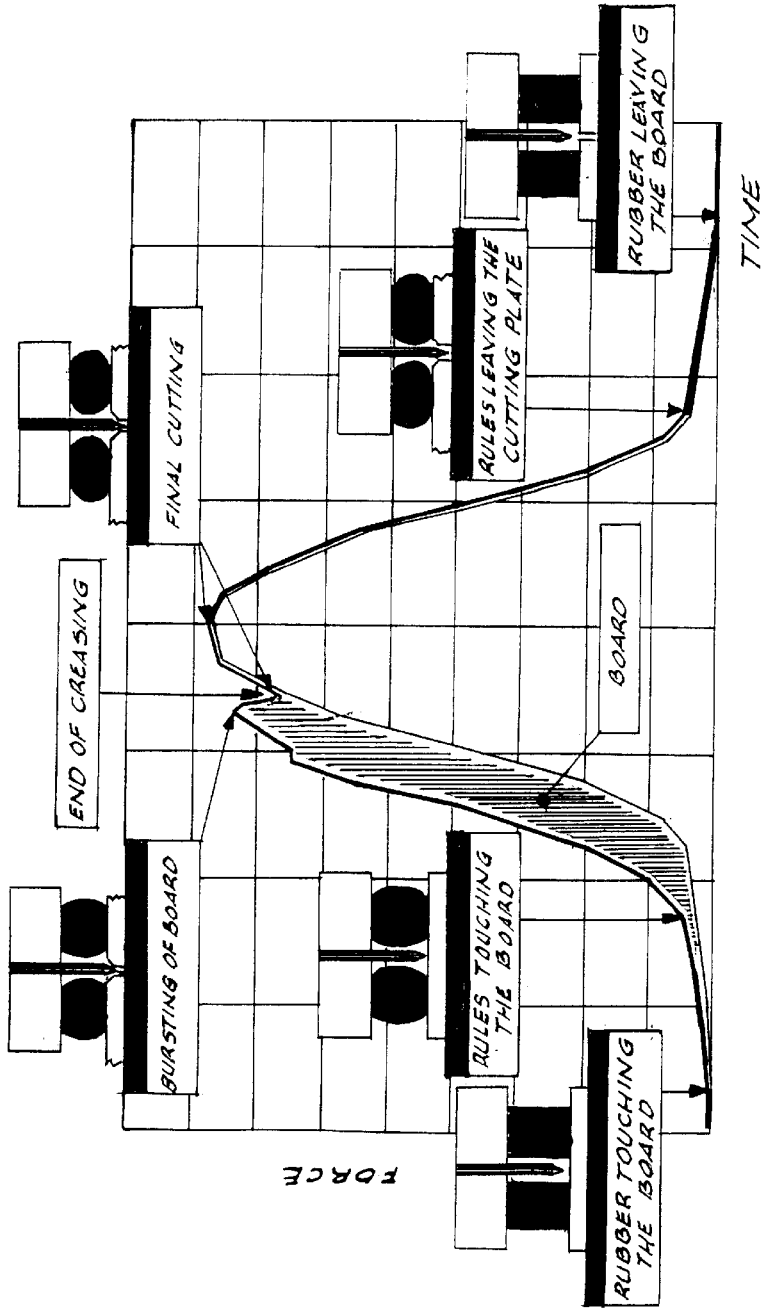
FIG. 1 is a graphical illustration which shows forces involved in cutting in force verses time.
Figure 2:
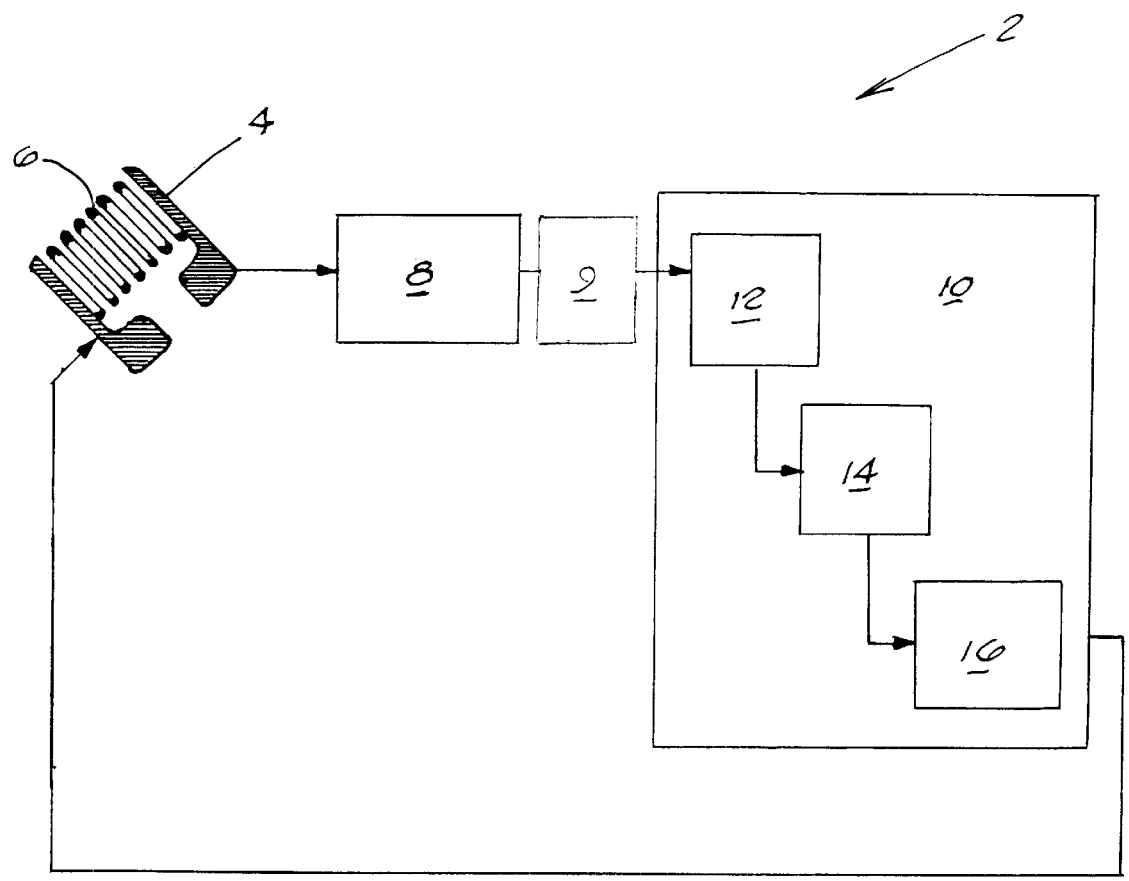
FIG. 2 is a block diagram of a platen die cutting monitoring system, according to the present invention.

With reference first to FIG. 2, there is illustrated an advantageous environment for use of the concepts of this invention. In particular, platen die cutting monitoring system 2 is illustrated. System 2 includes, in part, strain gage 4, platen die cutter 6, strain gage bridge amplifier and filter 8, conventional A/D converter 9, and data acquisition and processing means 10. Data acquisition and processing means 10 also includes a means to time average and waveform separate 12, a means for peak detection and analysis 14, and a means for cutting quality assessment 16.

Figure 3:
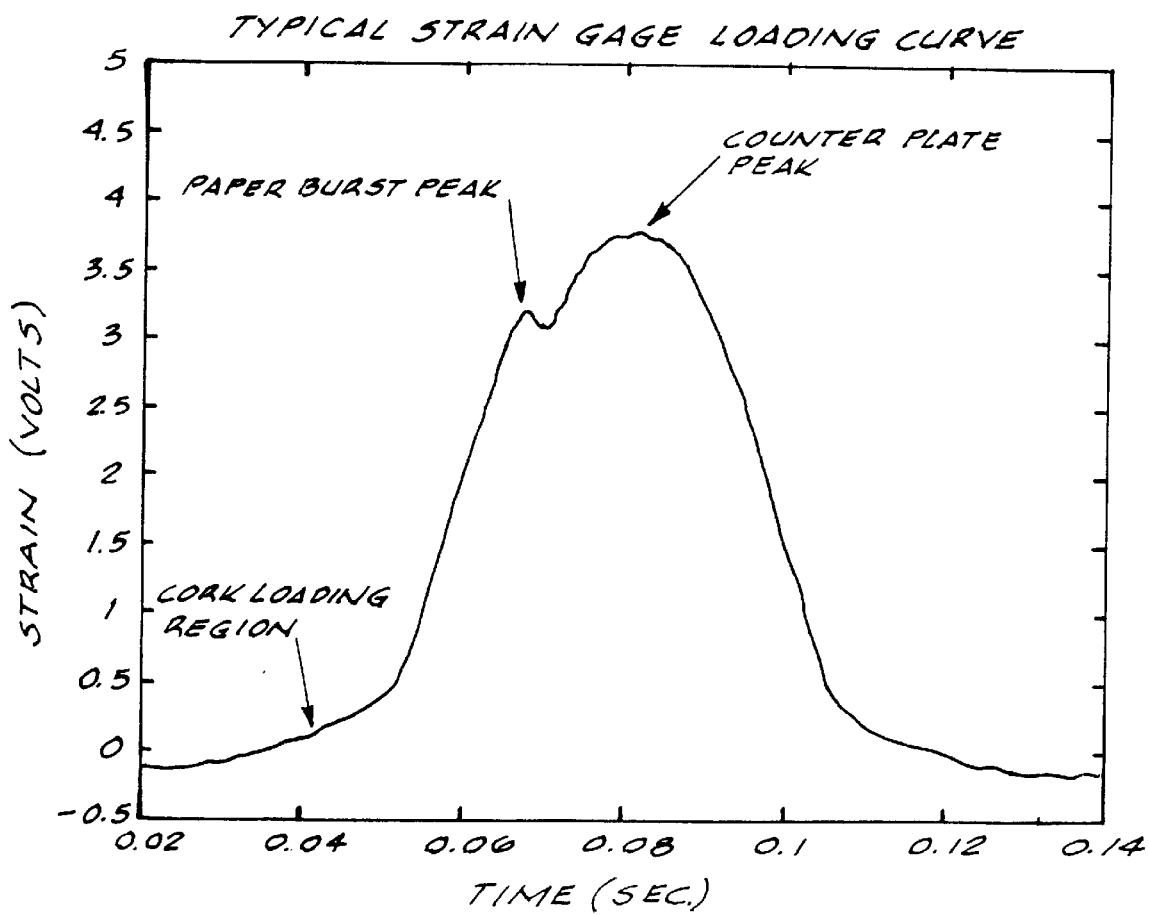
FIG. 3 is a graphical illustration of a typical strain gage loading curve in strain (volts) verses time (seconds)

The operation of system 2 will now be discussed. The strain gage 4 mounted on one support post (not shown) of platen cutter 6 measures the strain on the post during a platen cutting stroke. This strain is proportional to the force at the platen die 6. A typical loading curve (after filtering and amplification) is shown in FIG. 3. Several features of the curve (indicated in FIG. 3) change as the cutting loads on the platen die 6 change. These features can be related to the quality of cut produced by the platen cutter 6.

The first step in cutting quality determination is to condition the signal from strain gage 4. This is done at 8. 8, preferably, is a Wheatstone bridge and amplification means which converts the signal from strain gage 4 to a voltage signal. This voltage is then processed in conventional A/D converter 9. The converted signal is then sent to 12 where the voltage signal is captured in digital form and time averaged using a conventional statistical analysis of the waveform to produce an average waveform signal. This average waveform signal is transmitted to 14 where peak detection and analysis is performed. In 14, the peaks of the average waveform from 12 are identified. In particular, a digital filter takes derivatives with respect to time and looks for minimum values of the derivatives. The maximum shear force and paper burst peaks, typically, occur at these minimum values. The peak values from 14 are sent to 16 for cutting quality assessment where a calculation is performed on the difference between the peak values. It is also to be understood that a threshold limit, which is particular to each platen die cutter 6, has also been programmed by conventional techniques into 16. If the actual difference between the peak values, i.e., the paper burst peak and the maximum shear force, come within the threshold limit, the operator of the platen die cutter 6 must adjust the die cutter, for example, by increasing the cutting force. Conversely, if the difference between the peak values is outside of the threshold limit, then the operator need not adjust platen die cutter 6.

In short, the two most critical features to identify on the curve are the maximum cutting force and the paper burst peak. The maximum cutting force is easily identified using conventional maximum-finding algorithms. Identifying the paper burst peak is accomplished by examining the filtered derivative of the average waveform, which allows the shoulder peak to be identified separately from the maximum force. The cutting quality can then be assessed by examining the difference between these two peaks.

Once the features of the curve are identified by the algorithm described above, the change in the peaks over time provides an indicator of die condition. As the difference between the paper burst peak and the maximum force shrinks below a threshold limit, the platen begins to leave portions of the paperboard uncut. If action to increase the difference in the peaks is taken before the difference falls below this threshold limit, then the paperboard is never left partially uncut, thereby ensuring delivery of a high-quality product from the platen cutter. The actions are, typically, either to increase the overall cutting force or to adjust the die to provide higher cutting forces in particular areas. Additionally, limiting the maximum force seen by the die can lengthen die life.

Figure 4:
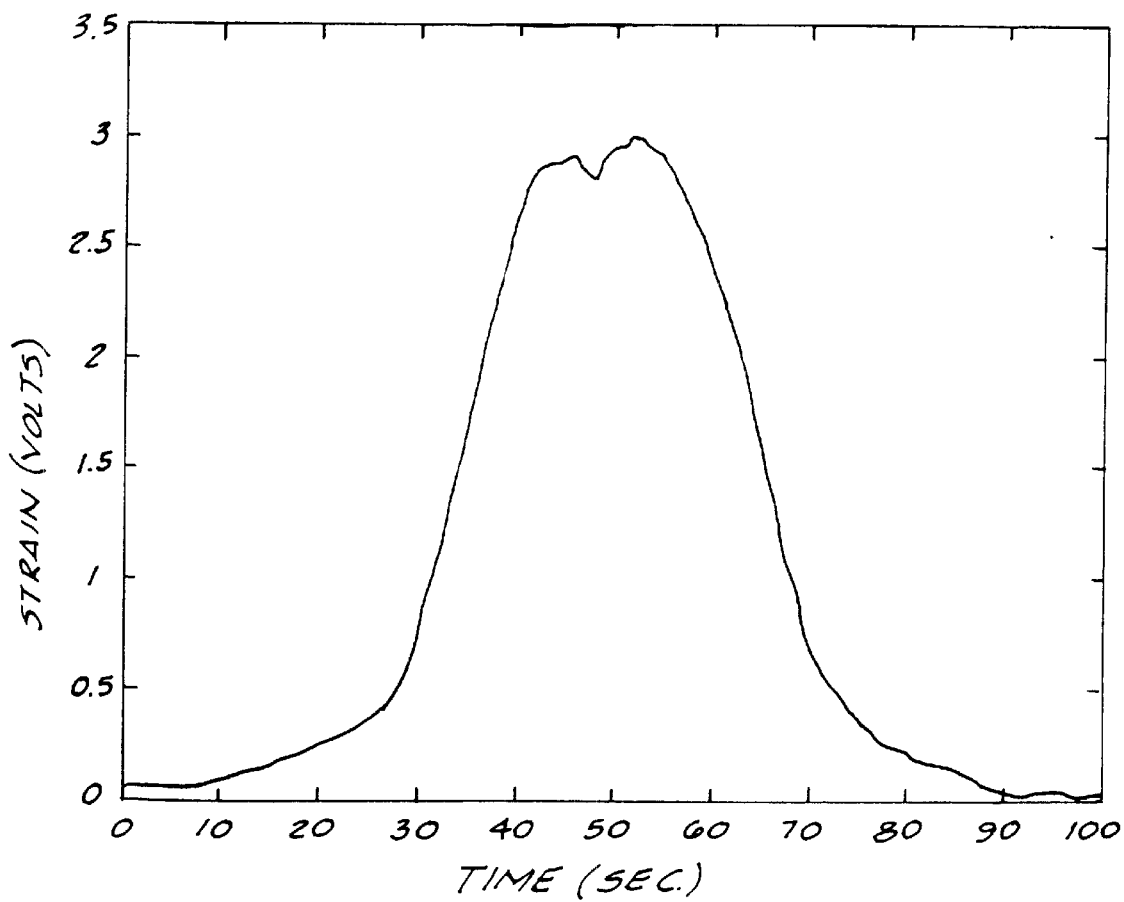
FIG. 4 is a graphical illustration showing an initial loading curve after installation of the platen die cutting monitoring system, according to the present invention in strain (volts) verses time (msec)
Figure 5:
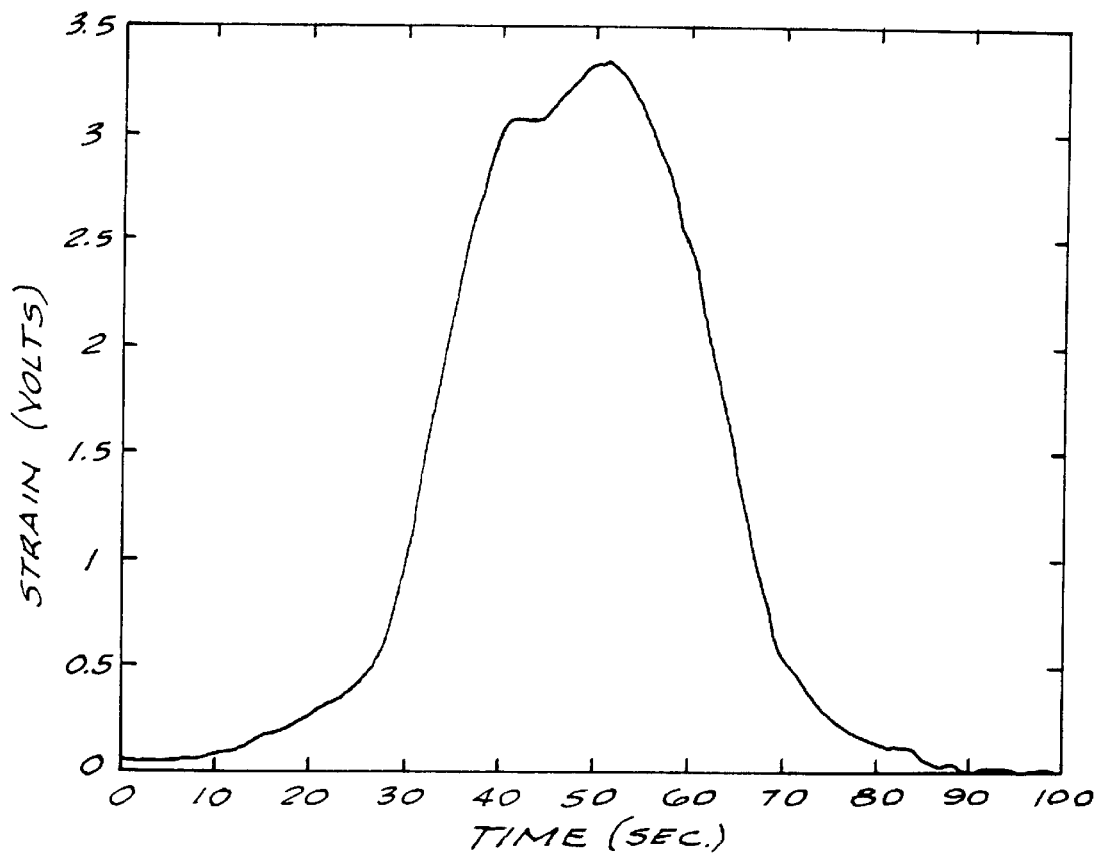
FIG. 5 is a graphical illustration showing a loading curve after tonnage adjustment for strain (volts) verses time (msec).

When system 2 was initially tested, the first curve, as shown in FIG. 4, had almost equal peaks, with the shoulder peak—the paper burst peak—nearly reaching the maximum force. After adjusting the platen die cutter to increase the overall cutting force, the curve changed to a more typical cutting load curve, as shown in FIG. 5. At the same time, instances of partially cut paperboard found by visual inspection decreased, thereby showing the dependence of cutting on the threshold limit described above.

It is also to be understood that an extension of this system may be employed to use multiple strain gages to compare the forces on various sections of the platen die cutter. For instance, one strain gage will be mounted on each post which would allow comparison of forces across the cutter both width- and length-wise. Additional gages may provide information on skewness and torque.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for monitoring the operation of a platen die cutter wherein said method comprises the steps of:

measuring a strain of a platen die cutter during a cutting stroke;

producing an electronic signal of said strain;

conditioning said electronic signal of said strain to produce a waveform;

time averaging said waveform of said conditioned signal;

determining a paper burst strain peak and a counter plate strain peak from said waveform;

determining the strain peak difference between said paper burst strain peak and said counter plate strain peak; and comparing said measured strain peak difference with an established strain peak difference threshold limit.

2. The method, as in claim 1, wherein said step of measuring a strain of a platen die cutter further comprises the step of using a strain gauge to measure said strain of said platen die cutter during said cutting stroke.

3. The method as in claim 1 further comprising the step of converting said electronic signal to a voltage value.

4. The method as in claim 1 wherein said time average waveform is digitally filtered.

5. The method as in claim 1 wherein said cutter is adjusted if the difference between said paper burst strain peak and said counter plate strain peak is less than said established strain peak difference threshold limit.

* * * * *